United States Patent
Trigiani et al.

(10) Patent No.: US 6,442,953 B1
(45) Date of Patent: Sep. 3, 2002

(54) APPARATUS AND METHOD FOR DIAGNOSING PERFORMANCE OF AIR-CONDITIONING SYSTEMS

(75) Inventors: Phil Trigiani; Tony Ferraro, both of Mississauga (CA); Ronald Lee Wheeler, Fort Worth, TX (US)

(73) Assignee: UView Ultraviolet Systems, Inc., Mississauga (CA)

( * ) Notice: Subject to any disclaimer, the term of this patent is extended or adjusted under 35 U.S.C. 154(b) by 7 days.

(21) Appl. No.: 09/723,137

(22) Filed: Nov. 27, 2000

(51) Int. Cl.[7] .............................. F25B 1/00; F25B 49/02
(52) U.S. Cl. .............................. 62/130; 62/127; 62/126
(58) Field of Search ................... 62/125, 127, 129, 62/130, 227, 126; 702/130, 182, 183

(56) References Cited

U.S. PATENT DOCUMENTS

| | | | | |
|---|---|---|---|---|
| 3,803,863 A | * | 4/1974 | Jednacz et al. ............... | 62/209 |
| 4,506,518 A | * | 3/1985 | Yoshikawa et al. ........... | 62/180 |
| 4,735,060 A | * | 4/1988 | Alsenz ........................ | 62/225 |
| 4,753,083 A | * | 6/1988 | Sato ............................ | 62/209 |
| 5,150,584 A | * | 9/1992 | Tomasov et al. ............. | 62/209 |
| 5,457,965 A | * | 10/1995 | Blair et al. .................... | 62/129 |
| 5,934,087 A | * | 8/1999 | Watanabe et al. ............. | 62/126 |
| 5,987,903 A | * | 11/1999 | Bathla ........................ | 62/129 |
| 6,055,819 A | * | 5/2000 | Kang .......................... | 62/184 |
| 6,330,802 B1 | * | 12/2001 | Cummings et al. ........... | 62/129 |

* cited by examiner

Primary Examiner—Marc S. Hoff
Assistant Examiner—Paul L Kim
(74) Attorney, Agent, or Firm—Bell, Boyd & Lloyd LLC

(57) ABSTRACT

The present application reveals a method and an apparatus for diagnosing performance of an air-conditioning system. The method comprising the steps of determining a temperature differential between inlet and outlet temperatures of a condenser in the air-conditioning system; determining a temperature differential between inlet and outlet temperatures of an evaporator in the air-conditioning system; determining a temperature differential between ambient and vent temperatures in the air-conditioning system; analyzing the differentials of the condenser, evaporator and ambient and vent temperatures; determining whether the air-conditioning system is properly functioning; and diagnosing performance of the air-conditioning system.

10 Claims, 5 Drawing Sheets

UView Ultraviolet
Systems Inc.

Auto Air conditioning
Diagnostic Report

System Type: TXV
Condenser in – 152F
Condenser out – 121F
PASS
Evaporator in – 114F
Evaporator out – 52F
FAIL
Ambient – 88F
Vent – 52F
PASS
Relative Humidity 39%
Overall Diagnostic
Number 28

UView Ultraviolet
Systems Inc.

Auto Air conditioning
Diagnostic Report

System Type: TXV
Condenser in – 151F
Condenser out – 121F
PASS
Evaporator in – 113F
Evaporator out – 50F
FAIL
Ambient – 87F
Vent – 53F
PASS
Relative Humidity 40%
Overall Diagnostic
Number 28

UView Ultraviolet
Systems Inc.

Auto Air conditioning
Diagnostic Report

System Type: OT
Condenser in – 151F
Condenser out – 120F
PASS
Evaporator in – 113F
Evaporator out – 56F
FAIL
Ambient – 88F
Vent – 53F
PASS
Relative Humidity 38%
Overall Diagnostic
Number 3

*FIG. 5*

APPARATUS AND METHOD FOR DIAGNOSING PERFORMANCE OF AIR-CONDITIONING SYSTEMS

BACKGROUND OF THE INVENTION

1. Field of the Invention

The present invention is for an apparatus and method to diagnose and performance test air-conditioning systems using temperature differentials of critical components, ambient temperature and humidity, along with software data.

2. Description of the Related Art

In the past, a pressure reading manifold was used in diagnosing air-conditioning performance. The manifold was connected to the high and low sides of the air-conditioning system and operating pressures read. Over the past decade, air-conditioning systems added complexity, thus making pressure readings alone not acceptable for diagnosing system performance. The pressure readings were also used in conjunction with ambient temperature, humidity or vent temperature to give a better indication of air-conditioning system performance. Even where temperatures are required for measuring system performance, prior art methods use a surface contact thermometer or an infrared (IR) thermometer, each of which only measures one reading at a time.

There is a need in the field for an apparatus that allows the diagnosis of an air-conditioning system without disrupting the integrity of the sealed air-conditioning system and that eliminates the danger of exposure to high pressure refrigerants.

SUMMARY OF THE INVENTION

The present application discloses a method and an apparatus for diagnosing performance of an air-conditioning system. The method comprises the steps of identifying whether the air-conditioning system comprises a fixed orifice type configuration or a thermostatic expansion valve type configuration; determining a temperature differential between inlet and outlet temperatures of a condenser in the air-conditioning system; determining a temperature differential between inlet and outlet temperatures of an evaporator in the air-conditioning system; determining a temperature differential between ambient and vent temperatures in the air-conditioning system; analyzing the differentials of the condenser, evaporator and ambient and vent temperatures for the fixed orifice type configuration and analyzing the differentials of the condenser and ambient and vent temperatures for the thermostatic expansion valve type configuration; determining whether the air-conditioning system is properly functioning; and diagnosing performance of the air-conditioning system.

In preferred embodiments of the method, a temperature differential of greater than 10° F. across the condenser is determinative of whether the air-conditioning system is properly functioning; a temperature differential of less than ±10° F. across the evaporator is determinative of whether the air-conditioning system is properly functioning; and a temperature differential of greater than 20° F. between the ambient and vent temperature is determinative of whether the air-conditioning system is properly functioning.

In another preferred embodiment, the method further comprises determining relative humidity of the air-conditioning system; and analyzing the relative humidity and the differentials of the condenser, evaporator and ambient and vent temperatures for the fixed orifice type configuration or analyzing the relative humidity and the differentials of the condenser and ambient and vent temperatures for the thermostatic expansion valve type configuration.

The apparatus for diagnosing performance of an air-conditioning system comprises means for determining a temperature differential between inlet and outlet temperatures of a condenser in the air-conditioning system; means for determining a temperature differential between inlet and outlet temperatures of an evaporator in the air-conditioning system; means for determining a temperature differential between ambient and vent temperatures in the air-conditioning system; means for analyzing the differentials of the condenser, evaporator and ambient and vent temperatures for a fixed orifice type of air-conditioning system and means for analyzing the differentials of the condenser and ambient and vent temperatures for a thermostatic expansion valve type of air-conditioning system; means for determining whether the air-conditioning system is properly functioning; and means for diagnosing performance of the air-conditioning system.

In preferred embodiments of this apparatus, a temperature differential of greater than 10° F. across the condenser is determinative of whether the air-conditioning system is properly functioning; a temperature differential of less than ±10° F. across the evaporator is determinative of whether the air-conditioning system is properly functioning; and a temperature differential of greater than 20° F. between the ambient and vent temperature is determinative of whether the air-conditioning system is properly functioning.

In another preferred embodiment, the apparatus further comprises means for determining relative humidity of the air-conditioning system and means for analyzing the relative humidity and the differentials of the condenser, evaporator and ambient and vent temperatures for the fixed orifice type of air-conditioning system and means for analyzing the relative humidity and the differentials of the condenser and ambient and vent temperatures for the thermostatic expansion valve type of air-conditioning system.

BRIEF DESCRIPTION OF THE DRAWINGS

FIG. 5 is a print out of three auto air-conditioning diagnostic reports.

DETAILED DESCRIPTION

The present invention is for an apparatus and method using the temperature differentials of critical components, ambient temperature and humidity, along with a built in software data chart to diagnose and performance test air-conditioning systems. The chart is also available as a hard-copy in an operating manual with trouble codes directly linked to the diagnostic measurements taken. The simplified apparatus and method allow quick performance test and quick diagnosis for even inexperienced air-conditioning technicians.

Figure 1:
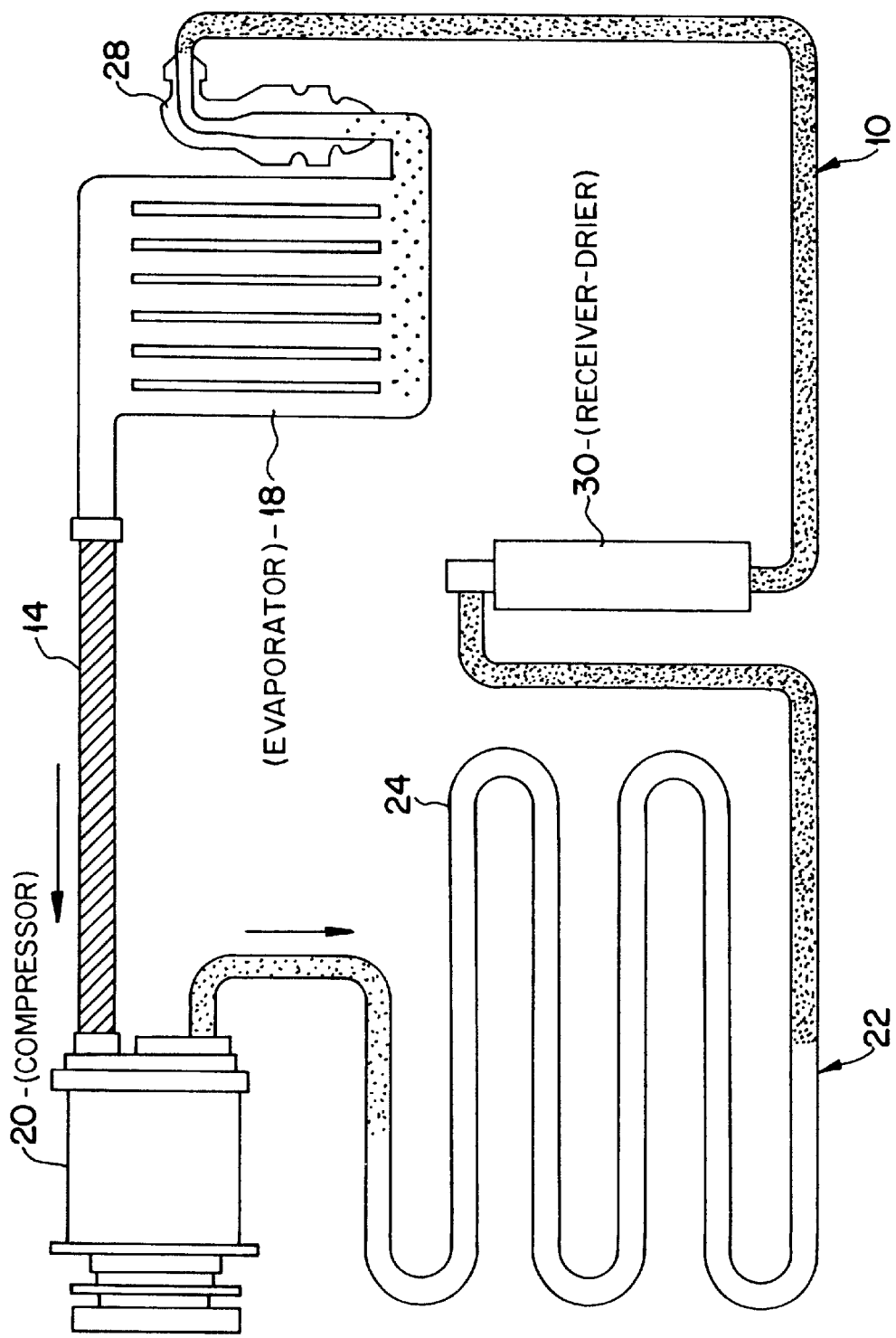
FIG. 1 is an illustration of a basic refrigeration system of an automotive air-conditioning system—thermostatic expansion valve (TXV) type system.
Figure 2:
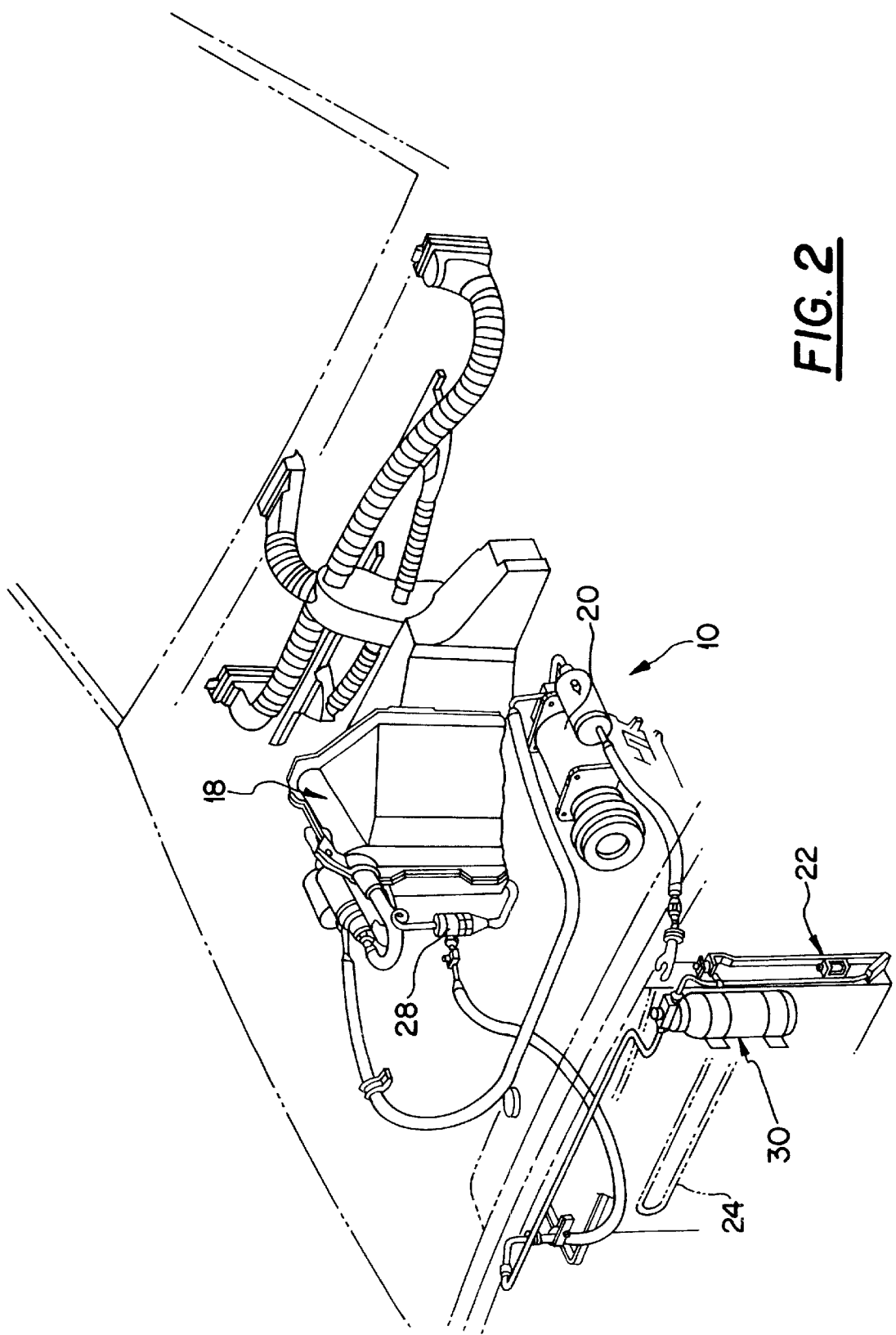
FIG. 2 is a perspective view of an automotive air-conditioning system showing the major components—thermostatic expansion valve type system.

Referring to the drawings in detail, wherein like numerals indicate like elements, FIGS. 1 and 2 illustrate a basic refrigeration system of an automotive air-conditioning system—thermostatic expansion valve (TXV) type system. FIG. 1 illustrates the basic automotive air-conditioning system 10, by which air inside a vehicle is cooled and dehumidified. FIG. 2 provides greater detail of the system as it is arranged in a vehicle.

A refrigerant 14, such as R-12, R134a, hydrocarbon (HC) or carbon dioxide ($CO_2$), circulates under pressure in the air-conditioning/refrigeration system. In each cycle, the refrigerant is caused to change phase from liquid to gas and back to liquid, absorbing heat from the passenger compartment of the vehicle and releasing heat outside the compartment.

More specifically, the air-conditioning system has an evaporator 18 unit where sub-cooled liquid refrigerant enters and is allowed to expand and absorb heat from warm air of the passenger compartment, causing the refrigerant to vaporize. The warm air of the passenger compartment is connected to the evaporator 18 via ducting, as seen in FIG. 2, such that cooled and dried air is re-circulated into the passenger compartment. After absorbing heat from the passenger compartment, the refrigerant gas is drawn from the evaporator 18 by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releases its heat of condensation and changes phase back to a hot liquid, still at a high pressure. The refrigerant 14 completes the cycle by passing through a thermostatic expansion valve 28, which meters the high pressure liquid refrigerant 14 as a low pressure spray into the evaporator 18.

In some systems, it is necessary to reservoir the liquid refrigerant before it is metered through the expansion valve because the demand of the evaporator varies under varying conditions. In other systems, it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment, a receiver-dehydrator, also referred to as a receiver-drier, 30 is located between the condenser 22 and the evaporator 18 to reservoir the refrigerant and remove moisture from it. In other air-conditioning systems (as shown in FIG. 3), an accumulator-dehydrator 32 may be located between the evaporator and compressor to accumulate the refrigerant vapor and remove moisture from it.

Figure 3:
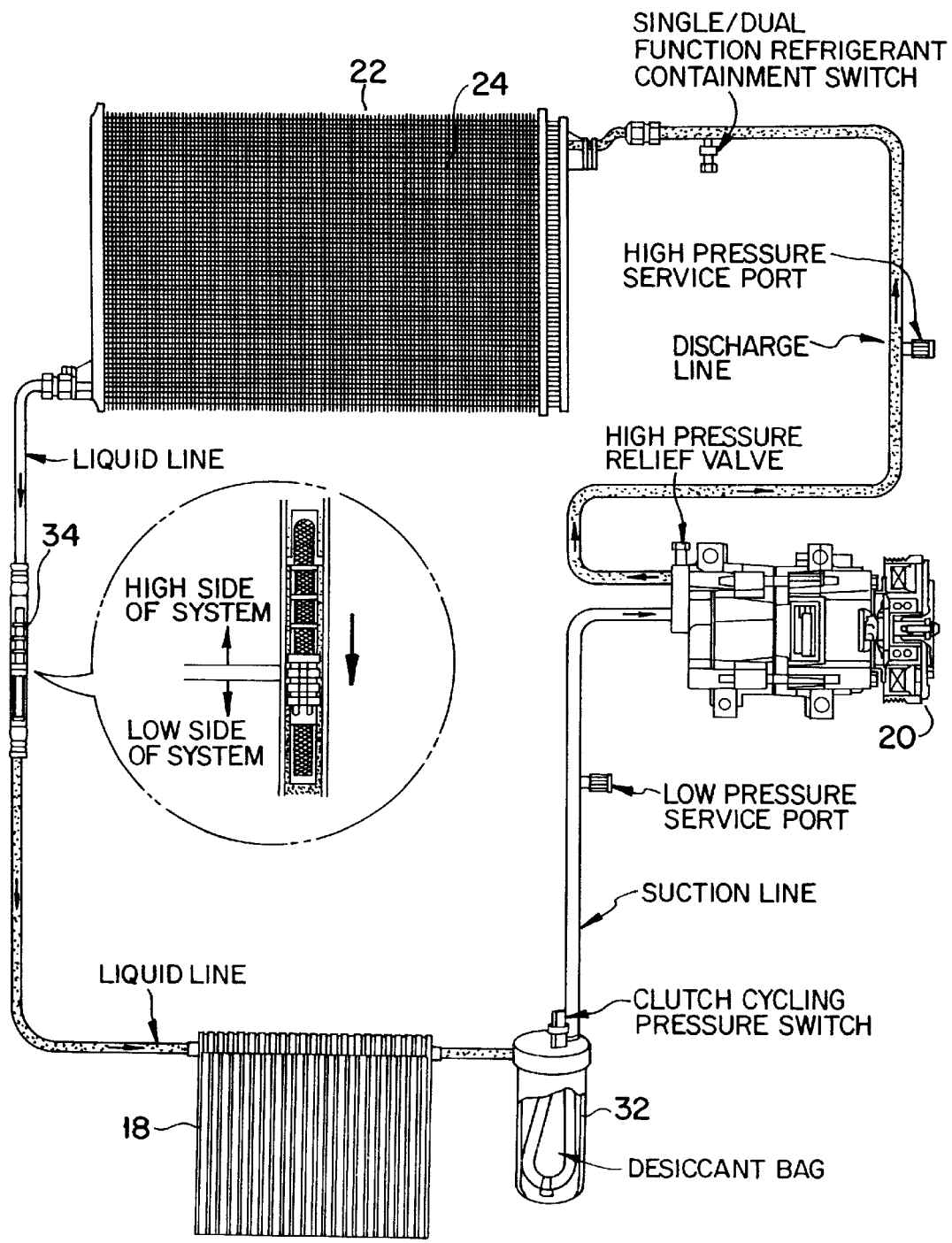
FIG. 3 is an illustration of another basic refrigeration system of an automotive air-conditioning system—fixed orifice type system.

FIG. 3 is an illustration of another basic refrigeration system of an automotive air-conditioning system—fixed orifice type system. The fixed orifice type configuration resembles the thermostatic expansion valve type configuration. The main difference between the configurations is the control of the compressor and hence the temperature of refrigerant inside the evaporator. In the fixed orifice type configuration, an orifice tube 34 is positioned between the condenser 22 and the evaporator 18. The compressor is usually cycled for optimal evaporator temperature using a pressure switch. The differences in configuration will determine the mode of operation for the apparatus of the present invention.

Figure 4:
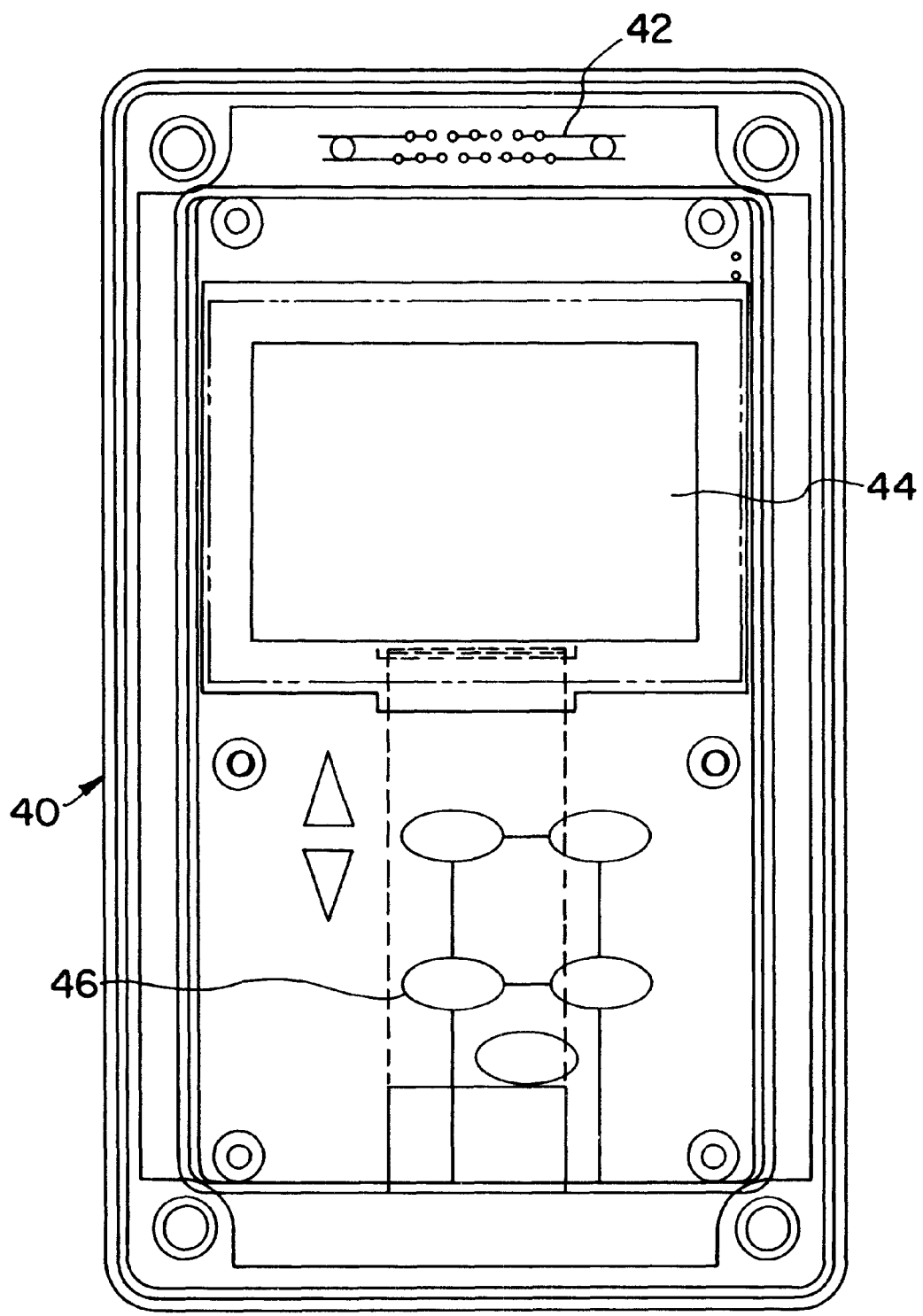
FIG. 4 is an illustration of the apparatus of the present invention for diagnosing and performance testing air-conditioning systems.

The apparatus of the present invention (see FIG. 4) uses temperature data from two key components of the air-conditioning system, namely, the condenser and evaporator. The apparatus measures inlet and outlet temperatures and calculates the differential of these two critical components along with ambient temperature and air-conditioning vent temperature, all simultaneously. The apparatus also uses the ambient humidity as a guideline for determining trouble codes and subsequent diagnostic guideline areas. By using these readings and their differentials with a diagnostic chart (Table 1), an air-conditioning system can be performance tested and even diagnosed.

More specifically, the apparatus uses the temperature difference between the ambient and vent temperatures and evaporator and condenser inlet and outlet temperatures to diagnose the performance of an air-conditioning system. The evaporator readings are only useful on air-conditioning systems containing a fixed orifice tube. On TXV type systems, the evaporator readings are not referenced in the diagnosis because the function of the thermostatic expansion valve is to modify flow to the evaporator effecting temperature readings.

Extensive testing has shown a definite correlation between these temperature differentials and system operation and problems. Various temperature differences are used to identify problems and suggest typical repairs.

The basis for the invention is the finding that the differences between the condenser inlet and outlet temperatures, evaporator inlet and outlet temperatures and the ambient and vent temperatures can be related to the system performance and can locate a component that is not functioning properly. Extensive testing has shown that a temperature differential of >10° F. across a condenser, less than ±10° F. across an evaporator and >20° F. between the ambient and vent temperature is normal for a properly functioning air-conditioning system. Any differential temperatures outside these ranges indicate that the air-conditioning system is not performing properly.

A major advantage of the present invention is that it allows the diagnosis of the air-conditioning system. without disrupting the integrity of the sealed air-conditioning system. Newer air-conditioning systems have a much smaller volume of refrigerant than older air-conditioning systems. Thus, the newer air-conditioning systems are more critically charged. By not accessing the sealed air-conditioning systems, the present invention does not affect its seals or volumes. Also, the present invention eliminates the danger of exposure to high pressure refrigerants. The present invention will allow a non-certified or minimally trained technician to safely diagnose the air-conditioning system without any environmental concerns for a potential accidental discharge of refrigerant and the related safety aspects of accessing the high pressure refrigerant lines.

EXAMPLES

The following examples are included to demonstrate preferred embodiments of the invention. It should be appreciated by those skilled in the art that the techniques disclosed in the examples which follow represent techniques discovered by the inventors to function well in the practice of the invention, and thus can be considered to constitute preferred modes for its practice. However, those of skill in the art should, in light of the present disclosure, will appreciate that many changes can be made in the specific embodiments which are disclosed and still obtain a like or similar result without departing from the concept, spirit and scope of the invention. More specifically, it will be apparent that certain components that are both mechanically and electronically related may be substituted for the components described herein while the same or similar results would be achieved. All such similar substitutes and modifications apparent to those skilled in the art are deemed to be within the spirit, scope and concept of the invention as defined by the appended claims.

To demonstrate the feasibility of the concept, several prototypes were constructed. Temperatures were measured using integrated circuit (IC) temperature sensors; however thermocouples (T/Cs), thermistors, resistance temperature detectors (RTDs) or IR (optical) temperature sensors could be used. The apparatus seen in FIG. 4 was used in the Examples. A cable harness connected the sensors to a cable connection 42 of the unit 40, with clamps holding the temperature sensors onto the air-conditioning piping (not shown). Care was taken to thermally isolate the sensor from the clamp to ensure accurate readings.

Output from the temperature sensors was conditioned using operational amplifiers and converted to a digital signal via an analogue to digital converter (A/D converter) on board a microprocessor. These signals may or may not be multiplexed, depending on the microprocessor used. The voltage readings were averaged over a period of time. A look-up table was used to convert the averaged readings into degrees F. An optional table provides degree C readings at the operators discretion. An LCD 44 displays all measurements and menu choices.

The microprocessor performs the following functions: reads temperatures, provides menu to LCD, calculates the differential temperatures and determines the diagnostic number by using a look-up table to assign diagnostic numbers depending on differential temperatures. The operator selects either an orifice tube or thermal expansion valve (TXV) system via a button 46, which instructs the microprocessor on which diagnostic look-up to use. There are several look-up tables which can be dependent on many variables such as, for example, temperature, humidity, system configuration, component structure (cross-flow condensers). The look-up tables can also be carried for different refrigerant types, for example, R-12, R-134a, carbon dioxide ($CO_2$), hydrocarbon (HC) and other combination solutions.

A relative humidity (RH) sensor can aid in diagnosis by assisting in determining the load on the system. A resistive sensor was used, but any other type of electronic RH sensor could be used.

The unit is handheld and battery operated. A scroll feature allows the operator to view temperatures and relative humidity. Pressing the hold button stores all values and allows a diagnostic number and condition of each component to be viewed by scrolling through the menu. A print button is used to print all temperatures, performance and diagnostic numbers on a linked or infrared printer.

A diagnostic chart is used to relate diagnostic numbers to system problems, listed in their most frequently occurring order (see Table 1).

Example 1

The air-conditioning system—TXV type (Nippondenso compressor, R-134a refrigerant, 38 ounces) in a 1991 Dodge Spirit (2.5 liter engine) was performance tested and diagnosed with the present invention. The owner complained that vent air from the air-conditioning system was not cold enough.

The apparatus of the present invention was connected to the condenser and evaporator of the air-conditioning system. The apparatus measured inlet and outlet temperatures and calculated the differential of these two critical components along with ambient temperature and air-conditioning vent temperature, all simultaneously. The advantage of simultaneous measurements is important in eliminating erroneous readings from temperature fluctuations in air-conditioning system operation. The apparatus also measured the relative humidity.

As seen in Table 2, vehicle test 1A, the inlet condenser temperature was 149° F. and the outlet condenser temperature was 116° F. A temperature differential of >10° F. across a condenser is normal for a properly functioning air-conditioning system.

The inlet evaporator temperature was 86° F. and the outlet evaporator temperature was 87° F. A temperature differential of ±10° F. across an evaporator is normal for a properly functioning air-conditioning system. However, this differential was not used in determining whether the air-conditioning system was properly functioning since the system was of the TXV type.

The ambient temperature was 86° F. and the vent temperature was 66° F. However, a temperature differential of $\leq 20°$ F. between the ambient and vent temperature is indicative of an improperly functioning air-conditioning system.

The apparatus also measured the relative humidity at 37%. By using these readings and their differentials with a diagnostic chart, the air-conditioning system was performance tested and diagnosed, i.e., the heater door of the air-conditioning system was found to be out of adjustment. After adjusting the heater door, the air-conditioning system was re-tested. As seen in Table 2, vehicle test 1B, all values were now found to be within normal limits and the vent air from the air-conditioning system was now cold.

Example 2

The air-conditioning system - fixed orifice type (R-134a refrigerant, 32 ounces) in a 1997 Pontiac Bonneville (3.8 liter engine) was performance tested and diagnosed with the present invention. The owner complained that vent air from the air-conditioning system was not cold enough.

The apparatus of the present invention was connected to the condenser and evaporator of the air-conditioning system. The apparatus measured inlet and outlet temperatures and calculated the differential of these two critical components along with ambient temperature and air-conditioning vent temperature, all simultaneously. The apparatus also measured the relative humidity.

As seen in Table 2, vehicle test 2A, the inlet condenser temperature was 136° F. and the outlet condenser temperature was 89° F. A temperature differential of >10° F. across a condenser is normal for a properly functioning air-conditioning system.

The inlet evaporator temperature was 43° F. and the outlet evaporator temperature was 73° F. A temperature differential of greater than 10° F. across an evaporator is indicative of an improperly functioning air-conditioning system.

The ambient temperature was 84° F. and the vent temperature was 68° F. A temperature differential of $\leq 20°$ F. between the ambient and vent temperature is indicative of an improperly functioning air-conditioning system.

The apparatus also measured the relative humidity at 68%. By using these readings and their differentials with a diagnostic chart, the air-conditioning system was performance tested and diagnosed, i.e., the air-conditioning system was found to be 50% low on refrigerant. After re-charging with refrigerant, the air-conditioning system was re-tested. As seen in Table 2, vehicle test 2B, all values were now found to be within normal limits and the air-conditioning system produced cold air.

Example 3

The air-conditioning system—fixed orifice type (R-134a refrigerant, 44 ounces) in a 1999 Cadillac Escalade (5.7 liter engine) was performance tested and diagnosed with the present invention. The owner complained that the air-conditioning system took too long to cool down the compartment.

The apparatus of the present invention was connected to the condenser and evaporator of the air-conditioning system. The apparatus measured inlet and outlet temperatures and calculated the differential of these two critical components along with ambient temperature and air-conditioning vent temperature, all simultaneously. The apparatus also measured the relative humidity.

As seen in Table 2, vehicle test 3A, the inlet condenser temperature was 124° F. and the outlet condenser temperature was 91° F. A temperature differential of >10° F. across a condenser is normal for a properly functioning air-conditioning system.

The ambient temperature was 79° F. and the vent temperature was 49° F. A temperature differential of >20° F. between the ambient and vent temperature is normal for a properly functioning air-conditioning system.

The inlet evaporator temperature was 54° F. and the outlet evaporator temperature was 71° F. A temperature differential of greater than 10° F. across an evaporator is indicative of an improperly functioning air-conditioning system.

The apparatus also measured the relative humidity at 75%. By using these readings and their differentials with a diagnostic chart, the air-conditioning system was performance tested and diagnosed, i.e., the air-conditioning system was found to be 25% low on refrigerant. After re-charging with refrigerant, the air-conditioning system was re-tested. As seen in Table 2, vehicle test 3B, all values were now found to be within normal limits and the air-conditioning system cooled down the compartment in a reasonable period of time.

FIG. 5 is a print out of three additional auto air-conditioning diagnostic reports. Each report shows the condenser inlet and outlet temperatures, evaporator inlet and outlet temperatures and the ambient and vent temperatures, whether each of the temperatures differentials pass or fail, the relative humidity, and an overall diagnostic number for each report.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus, it is to be understood that variations in the present invention can be made without departing from the novel aspects of this invention as defined in the claims. All patents and articles cited herein are hereby incorporated by reference in their entirety and relied upon.

TABLE 1

| Code # | Symptom | Possible Cause |
|---|---|---|
| Code 1 | Indicates the system is performing as designed and all supporting systems are operational. | |
| Code 19 (2) | Proper heat transfer is not occuring in the Condesor or supporting components | Condenser internal restrictions Fan Clutch (rear wheel drive vehicles) Condenser cooling fan operation (high ampere draw) Engine cooling system (Radiator) Vehicle air dam (missing or damaged) Vehicle equipped with frontal bra restricting airflow Condensor sealing gaskets Compressor discharge hose with muffler Trash between condenser and vehicle radiator Mixed refrigerants (contaminated with air) |
| Code 3 | Temperature drop across evaporator is too high | System undercharge Orifice tube restriction Or Temperature decreases across evaporator System overcharged Mixed or contaminated refrigerant |
| Code 21 (4) | Not enough heat transfer across condensor and too much heat transfer across evaporator | Mixed or Contaminated refrigerant Condensor internal restrictions Fan Clutch (Rear wheel Drive vehicles) Condensor cooling fan operation Engine cooling system (radiator) Condensor sealing gaskets Trash between condensor and radiator System overcharged or possibly undercharged |
| Code 7 | Not enough temperature drop between ambient air and vent outlet temp | Heater controls operation |
| Code 25 (8) | Not enough temp drop between vent temp and ambient air and not enough temp drop between condensor in and out | Heater controls operation Plugged or restricted condensor operation Overcharge condition |
| Code 9 | Not enough temp drop between vent temp and ambient air and too much temp drop across evaporator | Heater controls operation Mixed refrigerant Undercharged |
| Code 27 (10) | Not enough temp drop across all ranges (evap, condensor, ambient) | Mixed refrigerant Severe undercharge Condensor restriction Severe overcharge |
| TXV sytems diagnosis | | |
| Code 1 | Everything OK | |
| Code 34 (11) | Not enough temp drop across condensor | Mixed refrigerant or contaminated |
| Code 30 (12) | Not enough temperature between ambient air & vent outlet temperature | Heater controls operation |
| Code 25 (13) | Note enough temp drop between vent temp and ambient air as well as not enough temp drop between condensor in and out | Heater controls operation Plugged or restricted condensor operation Overcharge condition |

TABLE 2

| Vehicle Test # | 1A | 1B | 2A | 2B | 3A | 3B |
|---|---|---|---|---|---|---|
| System Type | TXV | TXV | Orifice | Orifice | Orifice | Orifice |
| Condenser In | 149 | 153 | 136 | 148 | 124 | 132 |
| Condenser Out | 116 | 121 | 89 | 116 | 91 | 99 |
| Pass/Fail | P | P | P | P | P | P |
| Evaporator In | 86 | 92 | 43 | 45 | 54 | 58 |
| Evaporator Out | 87 | 93 | 73 | 50 | 71 | 53 |
| Pass/Fail | P | P | F | P | F | P |
| Ambient | 86 | 93 | 84 | 84 | 79 | 79 |
| Vent | 66 | 50 | 68 | 49 | 49 | 45 |
| Pass/Fail | F | P | F | P | P | P |

Legend
All temperatures expressed in ° F.
TXV: thermal expansion valve.
Orifice: orifice tube.

What is claimed is:

1. A method for diagnosing performance of an air-conditioning system, comprising the steps of:
   a) identifying whether the air-conditioning system comprises a fixed orifice type configuration or a thermostatic expansion valve type configuration;
   b) determining a temperature differential between inlet and outlet temperatures of a condenser in the air-conditioning system;
   c) determining a temperature differential between inlet and outlet temperatures of an evaporator in the air-conditioning system;
   d) determining a temperature differential between ambient and vent temperatures in the air-conditioning system;
   e) analyzing the differentials of the condenser, evaporator and ambient and vent temperatures for the fixed orifice type configuration and analyzing the differentials of the condenser and ambient and vent temperatures for the thermostatic expansion valve type configuration;
   f) determining whether the air-conditioning system is properly functioning; and
   g) diagnosing performance of the air-conditioning system.

2. The method of claim 1, wherein a temperature differential of greater than 10° F. across the condenser is determinative of whether the air-conditioning system is properly functioning.

3. The method of claim 1, wherein a temperature differential of less than ±10° F. across the evaporator is determinative of whether the air-conditioning system is properly functioning.

4. The method of claim 1, wherein a temperature differential of greater than 20° F. between the ambient and vent temperature is determinative of whether the air-conditioning system is properly functioning.

5. The method of claim 1, further comprising:
   a) determining relative humidity of the air-conditioning system; and
   b) analyzing the relative humidity and the differentials of the condenser, evaporator and ambient and vent temperatures for the fixed orifice type configuration or analyzing the relative humidity and the differentials of the condenser and ambient and vent temperatures for the thermostatic expansion valve type configuration.

6. An apparatus for diagnosing performance of an air-conditioning system, comprising:
   a) means for determining a temperature differential between inlet and outlet temperatures of a condenser in the air-conditioning system;
   b) means for determining a temperature differential between inlet and outlet temperatures of an evaporator in the air-conditioning system;
   c) means for determining a temperature differential between ambient and vent temperatures in the air-conditioning system;
   d) means for analyzing the differentials of the condenser, evaporator and ambient and vent temperatures for a fixed orifice type of air-conditioning system and means for analyzing the differentials of the condenser and ambient and vent temperatures for a thermostatic expansion valve type of air-conditioning system;
   e) means for determining whether the air-conditioning system is properly functioning; and
   f) means for diagnosing performance of the air-conditioning system.

7. The apparatus of claim 6, wherein a temperature differential of greater than 10° F. across the condenser is determinative of whether the air-conditioning system is properly functioning.

8. The apparatus of claim 6, wherein a temperature differential of less than ±10° F. across the evaporator is determinative of whether the air-conditioning system is properly functioning.

9. The apparatus of claim 6, wherein a temperature differential of greater than 20° F. between the ambient and vent temperature is determinative of whether the air-conditioning system is properly functioning.

10. The apparatus of claim 6, further comprising:
    a) means for determining relative humidity of the air-conditioning system; and
    b) means for analyzing the relative humidity and the differentials of the condenser, evaporator and ambient and vent temperatures for the fixed orifice type of air-conditioning system and means for analyzing the relative humidity and the differentials of the condenser and ambient and vent temperatures for the thermostatic expansion valve type of air-conditioning system.

* * * * *